Jan. 1, 1924
W. MERTÉ
PHOTOGRAPHIC OBJECTIVE
Filed Aug. 13, 1921
1,479,195
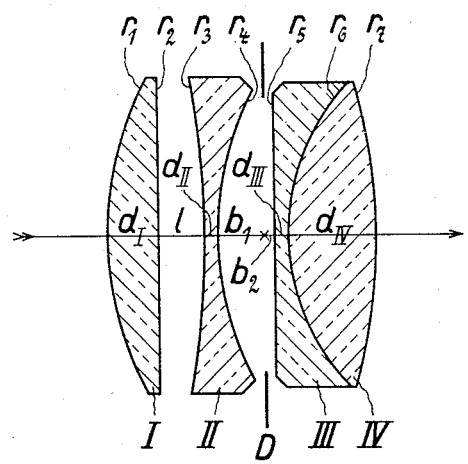
Inventor:
Willy Merté

Patented Jan. 1, 1924.

1,479,195

UNITED STATES PATENT OFFICE.

WILLY MERTÉ, OF JENA, GERMANY, ASSIGNOR TO THE FIRM OF CARL ZEISS, OF JENA, GERMANY.

PHOTOGRAPHIC OBJECTIVE.

Application filed August 13, 1921. Serial No. 492,119.

(GRANTED UNDER THE PROVISIONS OF THE ACT OF MARCH 3, 1921, 41 STAT. L., 1313.)

*To all whom it may concern:*

Be it known that I, WILLY MERTÉ, a citizen of the German Empire, residing at Jena, Germany, have invented a new and useful Photographic Objective (for which I have filed an application in Germany November 14, 1917; Austria, June 15, 1920; England, June 26, 1920, Patent 146213; France, July 9, 1920, Patent 519979; and Italy, July 9, 1920), of which the following is a specification.

The present invention relates to photographic objectives consisting of four lenses, two of which are joined in a collective cemented surface while between the other two, which are disposed at one and the same side of the cemented lenses, and of which the outer one is a collective lens and the inner one a dispersive lens, there is an air space, and they form a pair of facing surfaces having a negative power. The object of the invention is to secure in addition to the chromatic and a good astigmatic correction, as just attainable in the present type of objectives, which is described for instance in the patent specification 721,240, a still better spherical correction than hitherto obtained in this type.

According to the invention such improvement is obtained in an extraordinary degree by so choosing the radius of curvature of the cemented surface that it amounts at least to one-tenth and at the most to one-half of the focal length of the objective, and by additionally so choosing the kinds of glass for the two cemented lenses, that the difference between their refractive indices for sodium light lies between 0.05 and 0.02.

In the known objectives of the present type besides an anastigmatic flatness of the field extending over a comparatively large angle, a spherical correction had been attained so far that rays of a certain finite height of incidence, generally the rays impinging upon the marginal zone and the axial ray possessed a common axial point of intersection, hence, the same intersectional distance. However, all other rays impinging between these distinguished rays showed a spherical aberration, which from the axis onward increased from zero up to a maximum value and from there up to the distinguished zone again decreased to zero. By choosing the radius of curvature of the cemented surface and the kinds of glass for the two cemented lenses in accordance with the present invention, the increase of the spherical aberrations may be counteracted, and a more favourable course of the aberrations extending over the whole aperture of the objective be attained. When, in the customary manner, the differences between the intersectional distances of rays of any height of incidence and the intersectional distance of the axial ray are designated as abscisses and the heights of incidence as ordinates, it is possible to ensure, e. g., that the curved line which connects the corresponding points for rays of a different height of incidence contacts in the point of intersection of the axes with the axis of ordinates in a higher order than hitherto, or that, e. g., the curve gets two turning points. For both kinds of course of the curve the highest amount of the spherical aberration existing within the entire aperture-area may be kept in substantially lower bounds than hitherto. In most cases it will also prove possible to have the curve intersect the axis of ordinates within the aperture area of the objective, which will allow of the objectives corresponding to the invention to be designated as spherically corrected in the usual sense. When the curve of aberration, as is the case in the last named course, possesses two turning points, then as a rule two such points of intersection will be obtained. However, sometimes the kinds of course of the curve as described will not permit of the curve to intersect the axis of ordinates within the aperture-area, i. e., it will be impossible to obtain a spherical correction in the usual sense. But even in such cases in objectives corresponding to the invention the maximum amount of the aberration may still be kept within substantially lower bounds than hitherto possible in objectives of the present type. Moreover, in objectives corresponding to the invention the difference between the refractive indices of the two cemented lenses is great enough for also having the characteristic effect maintained, which the cemented surface produces on the correction of oblique pencils.

The annexed drawing shows a constructional example of an objective corresponding to the present invention in axial section.

In this example, which is elucidated in the table appended below, the two lenses with an air space between, marked I and II, are separated from the two cemented lenses, marked III and IV, by a diaphragm D, the outer lens of the two cemented lenses being a collective one and the inner lens a dispersive one. This objective is to be introduced into the path of the rays in such a manner that the single collective lens faces the object. The objective is intended for use for a maximum relative aperture of 1:5.5, and the anastigmatic flatness of the field extends to about 60°. In the drawing and in the table $r_1, r_2 \ldots$ signify the radii of curvature $d_I, d_{II} \ldots$ the axial thicknesses of the lenses, $b_1$ and $b_2$ the distances from the diaphragm D to the adjacent lens vertices, and $l$ the central thickness of the air-lens between the glass-lenses I and II. The numerical values of these magnitudes are proportional numbers applying to the focal length of the objective of 100 units. The kinds of glass used are characterized by the refractive index $n_D$, relating to sodium light, and by the reciprocal power of dispersion $\nu$. The data of construction are as follows:

| Radii of curvature. | Thicknesses and distances. |
|---|---|
| $r_1 = +\ 20.09$ | $d_I = 3.24$ |
| $r_2 = \pm\ \infty$ | $l = 2.96$ |
| $r_3 = -\ 53.71$ | $d_{II} = 0.82$ |
| $r_4 = +\ 18.89$ | $b_1 = 2.96$ |
| $r_5 = -1136.75$ | $b_2 = 0.46$ |
| $r_6 = +\ 13.31$ | $d_{III} = 0.82$ |
| $r_7 = -\ 33.72$ | $d_{IV} = 5.66$ |

*Kinds of glass.*

| | I. | II. | III. | IV. |
|---|---|---|---|---|
| $n_D =$ | 1.53227 | 1.56600 | 1.53212 | 1.57830 |
| $\nu =$ | 58.3 | 42.9 | 51.3 | 54.0 |

I claim:

Photographic objective consisting of four lenses, two of which, the difference between their refractive indices lying between 0.05 and 0.02 when sodium light is employed, are joined in a collective cemented surface, of which the radius of curvature amounts at least to one tenth and at the most to one half of the focal length of the objective, while between the other two lenses, which are disposed at one and the same side of the cemented lenses, and of which the outer lens is a collective one and the inner lens a dispersive one, there is an air-space, and they form a pair of facing surfaces having a negative power.

WILLY MERTÉ.

Witnesses:
 PAUL KRÜGER,
 RICHARD HAHN.